March 29, 1932. M. W. BROWN ET AL 1,851,084
INVERTED VENT CHECK VALVE
Filed May 1, 1931    2 Sheets-Sheet 1
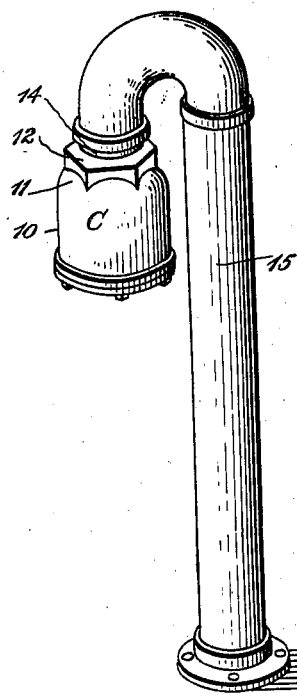
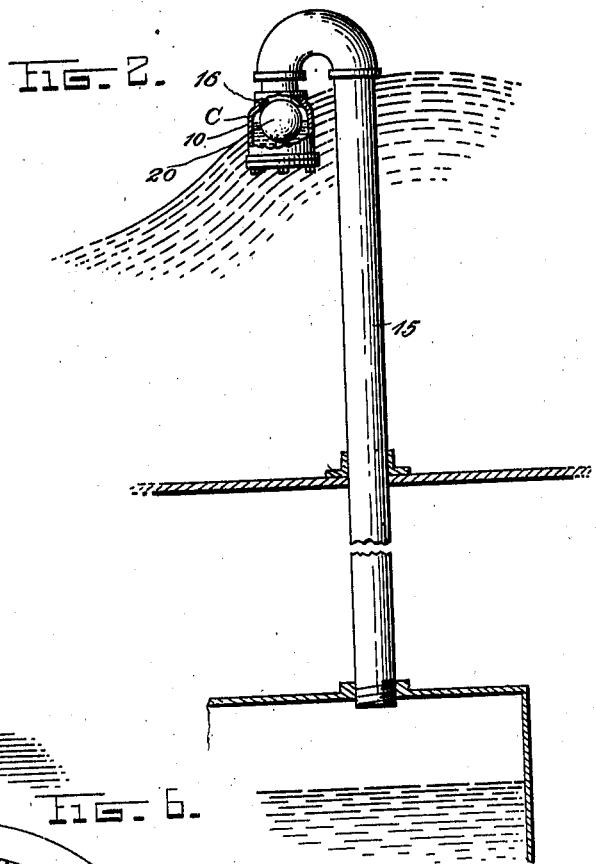
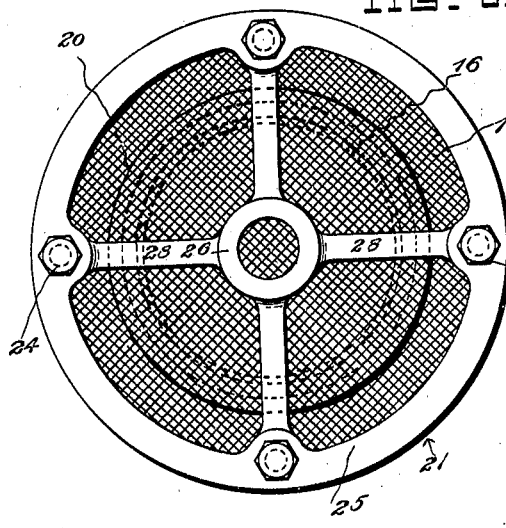
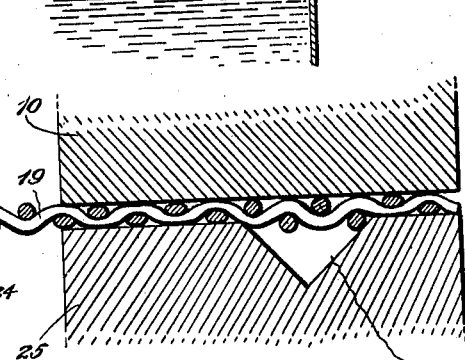
Inventors
M. W. Brown,
H. J. Klein
and R. H. Wager March 29, 1932.    M. W. BROWN ET AL    1,851,084
INVERTED VENT CHECK VALVE
Filed May 1, 1931    2 Sheets-Sheet 2
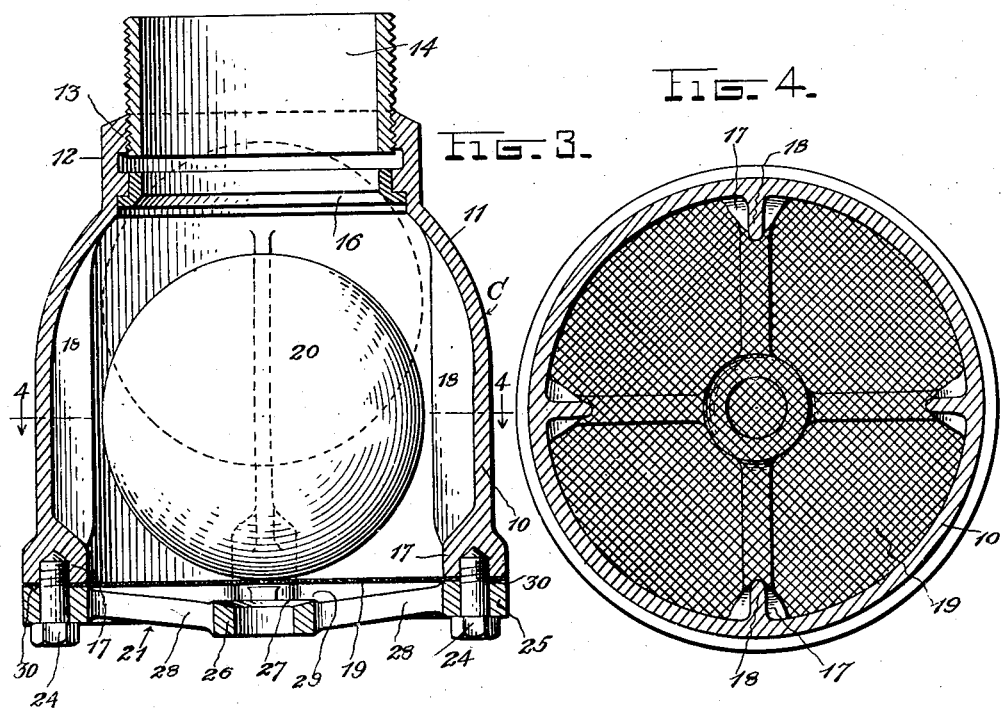
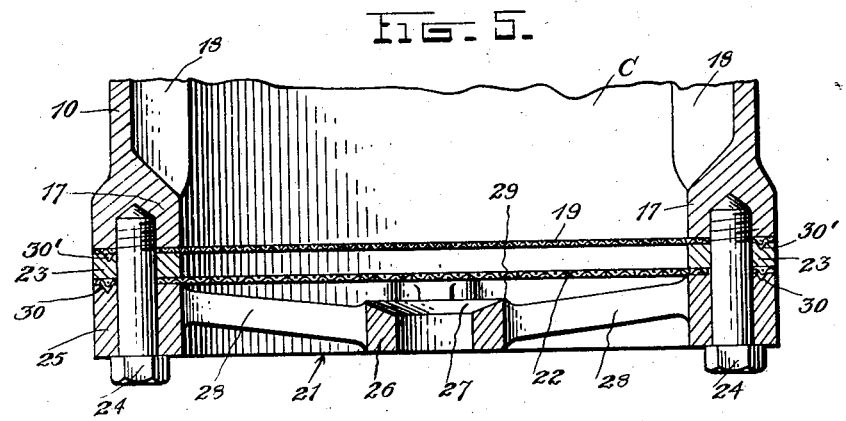
Inventors
M. W. Brown,
H. J. Klein
and R. H. Wager Patented Mar. 29, 1932

1,851,084

UNITED STATES PATENT OFFICE

MARTIN WILCOX BROWN, OF NEW YORK, N. Y., AND HENRY JOHN KLEIN, OF WOODRIDGE, AND ROBERT HUDSON WAGER, OF JERSEY CITY, NEW JERSEY

INVERTED VENT CHECK VALVE

Application filed May 1, 1931. Serial No. 534,388.

The invention relates to a new and improved check valve designed to prevent entrance of water through the vent pipes used on marine vessels for fuel oil tanks and other compartments, and it is the principal object of said invention to provide a simple, inexpensive, efficient and durable valve which will cope with various weather and other conditions encountered, and will act to keep the vent open except when there is danger of water entering, but at that time will automatically close and prevent water entrance.

The device embodies a buoyant ball housed within a housing and adapted to rise into contact with a valve seat, under the influence of water rising around the exposed part of the vent pipe, and further objects are to provide a screen which supports the ball and prevents water spray from reaching the interior of the vent pipe; to provide said screen of such nature that it will resiliently cushion the ball whenever it descends from a raised position; to provide said screen of sufficiently fine form as to exclude flame from the gases within the vent pipe; to provide for free rolling of the ball on the screen with movements of the ship and to hence prevent said ball from freezing to the screen or otherwise becoming adhered thereto, for instance, if the screen becomes coated with oil from the gases escaping through the vent; to provide a bonnet below the screen which protects the latter to a large extent against injury and serves to support both screen and ball if said screen becomes damaged and sags; to provide said bonnet of such form that it will not interfere with cushioning of the ball even if said screen becomes depressed onto said bonnet; to provide such a relation of screen and bonnet that the latter serves to prevent ship painters from sealing the passages of the screen with paint; to provide for tight anchorage of the screen to the casing of the valve without the provision of any means having a tendency to tear or otherwise injure said screen; to provide for such free passage of air around the ball that it cannot be moved to its seat by air entering the vent pipe rather rapidly, for instance, when pumping out the fuel tanks, etc.

With the foregoing in view, the invention resides in the novel subject matter herinafter described and claimed, description being accomplished by reference to the accompanying drawings.

Fig. 1 is a perspective view showing the improved check valve applied to an inverted vent.

Fig. 2 is a sectional view partly in elevation illustrating the manner in which the buoyant ball closes against the seat whenever water rises around the exposed part of the vent pipe.

Fig. 3 is a vertical sectional view through the check valve, the ball however being shown in elevation.

Fig. 4 is a horizontal sectional view on line 4—4 of Fig. 3.

Fig. 5 is an enlarged detail sectional view illustrating the manner in which two screens may be employed if desired.

Fig. 6 may be considered as a lower end elevation when using the structure shown in Fig. 3 or that illustrated in Fig. 5.

Fig. 7 is an enlarged detail vertical section showing the manner in which the screen is clamped.

Preferred features of construction have been employed and will be specifically described, with the understanding however, that within the scope of the invention as claimed, minor variations may be made.

The valve embodies a casing C having a cylindrical side wall 10 and a dome-like upper end 11 which merges into said side wall, said end 11 being provided with an upstanding, externally hexagonal boss 12 having an opening 13 tapped for reception of a short nipple 14 or other terminal on an inverted vent pipe 15. At the juncture of the boss 12 with the casing end 11, the casing is provided with an internal downwardly facing valve seat 16 of continuous shape and so secured in place that it may be readily replaced with a new seat whenever necessary. The lower end of the wall 11 terminates in a horizontal plane and at a plurality of circumferentially spaced points, is thickened by providing it with integral lugs 17. Rising from these lugs and integral with the inner side of the wall 10, are a number of thin flat ribs 18 whose upper ends are joined integrally with the casing end 11.

The lower end of the casing C is provided with a woven wire screen 19 which is stretched tightly across the same so that it will be vertically springy or resilient. The meshes of this screen are sufficiently fine to exclude flame from the casing C in case of emergency or when using blow torches or the like around the vent, and said meshes are preferably about thirty to the inch. The screen 19 supports a buoyant ball 20 which is preferably hollow and formed from metal. We prefer the use of Monel metal for this ball, for the seat 16 and for the screen 19, but for most other parts, cast-iron plated with non-corrosive metal, is sufficient. The ball 20 is of a diameter somewhat less than the distance between any two opposed ribs 18 and hence said ball may have free though limited rolling movement upon the screen, preventing it from freezing to said screen or becoming stuck thereto from other causes, for instance, when the screen becomes coated with oil carried in vaporous form through the vent pipe. The rolling movements of the ball 20 take place with the movements of the ship and if there be any tendency for a film of spray to freeze upon the screen 19 and said ball, the continual knocking of the latter against the ribs 18 and its rolling upon the screen will resist such tendency. Then too, each time the ball rises and descends from the action of water against it, or other cause, the descent of the ball is cushioned by said screen, and the almost continual vibration of the screen so effected, tends further to prevent water from freezing upon it, and moreover will not permit the accumulation of any great amount of oil or the like upon said screen.

In securing the screen 19 in place, we employ a novel bonnet 21. This bonnet may be secured either directly against the screen 19, or against a second screen 22 (Fig. 5). When this second screen is used, its meshes are preferably about twenty to the inch, and it will serve to protect the screen 19 against shock from forcible waves. When the two screens are employed, a spacing ring 23 is disposed between them, as seen in Fig. 5. Whether the bonnet 21 be instrumental in securing only one or a plurality of screens in place, it is attached to the lower end of the casing wall 10, by cap screws 24 treated to resist corrosion, and when the two screens and the spacer 23 are used, the screws 24 also secure said spacer in place.

The bonnet 21 embodies a continuous rim 25 directly below the casing wall 10 and lying against the lower side of the screen 19 or 22, as the case may be, the screws 24 passing through openings in said rim. Within the confines of the rim 25, there is a ring 26 which is spaced downwardly from the ball-supporting portion of the screen and is spaced around the point at which the ball normally engages the screen, said ring being provided with an outwardly inclined upper edge 27. Outwardly inclined radial arms 28 are integral with the ring 26 and with the rim 25, these arms and said ring being downwardly spaced from the screen so that they cannot interfere with normal vertical springing of said screen. Even if the screen be forcibly depressed by the ball 20 so that it contacts with the ring 26, the contact between screen and ring will take place only at the upper extremity 29 of said ring, leaving the ball-engaging portion of the screen free of contact with the ring so that it may even then resiliently support the ball to cushion its descending movements. The inclination 27 of the ring 26 also insures that no water or oil shall accumulate upon it. The same is true of the inclination of the arms 28.

To assist materially in anchoring the screen 19 or 22, as the case may be, the upper side of the rim 25 is formed with a continuous groove 30 adapted to receive the full thickness of the screen (see Fig. 7) when the screws 24 are tightened and the portions of the screen at opposite sides of said groove are compressed. The part of the wall 10 opposite the groove 30 or the part of the spacer 23 opposite said groove, as the case may be, is free from any means tending to force the screen into the groove, so that there is no danger of tearing or breaking said screen. Nevertheless, by so clamping the screen that portions of it are compressed to a dimension thinner than the normal thickness of the screen, and by having the normal thickness received in the groove, tight anchorage is insured which will not permit loosening of the screen even under the most trying circumstances.

The upper side of the spacer 23 is provided with a groove 30' corresponding to the groove 30 and serving the same function.

A check valve constructed as or substantially as herein shown and described, is advantageous from numerous standpoints. The inward spacing of the ball 20 from the wall 10 of the casing C, by the ribs 18, insures that free escape of gases shall occur and that air rapidly entering the vent pipe, for instance, when pumping out the fuel tanks, shall not elevate the ball against its seat. When at sea, the continual rolling of the ship causes the ball 20 to roll upon the screen 19, thus continually vibrating both the screen and the ball and preventing them from sticking together from one cause or another, as well as preventing accumulation of frost, ice or oil vapor upon ball and screen. Any time water rises around the casing C, for instance, when the deck of the vessel is awash, the ball 20 is buoyed by said water and it tightly engages the seat 16 to prevent any of the water from entering the vent pipe. As soon as the water recedes, the ball 20 descends upon the screen 19 and its descending movement is effectively cushioned, even though the screen be depressed until it contacts with the upper extremity 29 of the ring 26. Whenever spray strikes the valve, the screen or screens at the lower end thereof will not permit such spray to reach the vent pipe, whereas if the screen opening to the atmosphere were at some other location, spray could readily enter.

The bonnet 21 protects the screen or screens to a large extent against injury, by shielding them against being struck with various objects in the vicinity of the valve. Then too, should the screen become broken, this bonnet will support both screen and ball until repair can be made. Moreover, when ship painters are at work upon the vessel, the bonnet 21 renders the screen more or less inaccessible and hence there is little if any danger of the painters applying paint to said screen and hence sealing its passages. By preference, the ring 26 at the center of the bonnet 21 is above the plane in which the lower ends of the screws 24 are located. Hence, should the valve be dropped or forcibly rested upon the deck of the ship or other part, for instance, during installation, there is little danger of breaking said bonnet, even though it be formed from cast-iron or the like.

It will be seen from the above that the conditions under which the valve must operate, have been given due consideration, and that the invention has been embodied in such form as to cope as successfully as possible with all conditions encountered.

The details disclosed have proven to be most advantageous, but attention is again invited to the fact that within the scope of the invention as claimed, variations may be made.

We claim:—

1. An inverted vent check valve comprising a casing having a continuous downwardly facing valve seat and an opening above said seat for connection with an inverted vent pipe, the lower end of said casing being open, a screen secured across said open lower end of the casing, said screen being sufficiently fine to exclude flame, and a buoyant ball within said casing normally resting on said screen and adapted for co-action with said seat upon ascent, said casing being imperforate from said screen to said seat to exclude flame and spray from the vent pipe.

2. An inverted vent check valve comprising a casing having a continuous downwardly facing valve seat and an opening above said seat for connection with an inverted vent pipe, the lower end of said casing being open, a screen secured across said open lower end of the casing, said screen being vertically resilient, and a buoyant ball resting normally on said screen and adapted for co-action with said seat upon ascent, said screen serving to cushion descending movements of said ball.

3. An inverted vent check valve comprising a casing having a continuous downwardly facing valve seat and an opening above said seat for connection with an inverted vent pipe, the lower end of said casing being open, a screen secured across said open lower end of the casing, a buoyant ball within said casing for co-action with said seat upon ascent, said ball resting normally upon said screen, and an openwork bonnet secured to said lower end of said casing in downwardly spaced relation with said screen, said bonnet protecting said screen to a large extent against damage, and serving to support said ball and screen should the latter become injured.

4. An inverted vent check valve comprising a casing having a continuous downwardly facing valve seat and an opening above said seat for connection with an inverted vent pipe, the lower end of said casing being open, a vertically resilient screen secured across the open lower end of said casing and sufficiently fine to exclude flame from said casing, a buoyant ball resting on said vertically resilient screen and having limited rolling movement thereon, said ball being co-operable with said seat upon ascent and upon descending movements being cushioned by said vertically resilient screen, and an openwork bonnet secured to said lower end of the casing in downwardly spaced relation with said screen, said bonnet protecting said screen to a large extent against damage and serving to support said ball and screen should the latter become injured.

5. An inverted vent check valve comprising a casing having a downwardly facing continuous valve seat and an opening above said seat for connection with an inverted vent pipe, said casing having an open lower end, a woven wire screen lying against the lower end of the casing side wall and extending across said open end of the casing, a bonnet having a continuous rim lying against said screen under said side wall, fastening means securing said rim and side wall together and clamping said screen in place, the portion of said bonnet within the confines of its rim being downwardly spaced from said screen to allow the latter to vertically spring, and a buoyant ball in said casing resting normally upon said screen.

6. An inverted vent check valve comprising a casing having a downwardly facing continuous valve seat and an opening above said seat for connection with an inverted vent pipe, said casing having an open lower end, a woven wire screen lying against the lower end of the casing side wall and extending across said open end of the casing, a bonnet having a continuous rim lying against said screen under said side wall, fastening means securing said rim and side wall together and clamping said screen in place, the portion of said bonnet within the confines of its rim consisting of a central ring having an outwardly inclined upper edge and radial arms inclined from said ring to said rim, and a buoyant ball resting on said screen at a point above the center of said ring, said ball being cooperable with said seat upon ascent, said screen serving to cushion descending movements of said ball even if depressed into contact with the upper extremity of said ring.

7. An inverted vent check valve comprising a casing having a cylindrical side wall and a dome-like upper end merging into said side wall, said upper end having a continuous downwardly facing valve seat and an opening above said seat for connection with an inverted vent pipe, said side wall being provided at its inner side with circumferentially spaced vertical ribs, a flame-excluding vertically resilient screen extending across the lower end of the casing and lying against the lower end of said side wall, a bonnet having a rim lying against the lower side of said screen under said side wall, fastening means securing said rim and side wall together and clamping said screen in place, and a buoyant ball resting centrally on said screen and adapted for co-action with said seat upon ascent, said ball being spaced inwardly from said ribs and hence having limited rolling movement upon the screen, the portion of said bonnet within the confines of said rim consisting of a central ring spaced around the point at which the ball contacts with the screen and having an outwardly inclined upper edge, and radial arms inclining from said ring to said rim, said screen serving to cushion downward movements of said ball even if depressed into contact with the upper extremity of said ring.

8. In an inverted vent check valve, a casing having a continuous wall member, a woven wire screen lying against an end of said wall member, a rim member lying against the side of said screen opposite said wall member, and fasteners securing said rim and wall member together, the screen engaging side of at least one of said members having a continuous groove which receives the normal thickness of the screen when the portions of said screen at opposite sides of said groove are compressed by tightening said fasteners, the portion of the other member opposite said groove having no parts for forcing the screen into the groove.

9. An inverted vent check valve comprising a casing having a continuous downwardly facing valve seat and an opening above said seat for connection with an inverted vent pipe, the lower end of said casing being open, a screen across said open end of the casing, a buoyant ball within said casing normally resting on said screen and adapted for co-action with said seat upon ascent, said ball being of less diameter than the interior of the casing and free to roll upon said screen, and narrow vertical ribs on the inner side of the casing side wall adapted to limit rolling of the ball and to prevent contact thereof with said casing side wall.

In testimony whereof we affix our signatures.

MARTIN WILCOX BROWN.
HENRY JOHN KLEIN.
ROBERT HUDSON WAGER.